Patented May 19, 1942

2,283,809

UNITED STATES PATENT OFFICE 2,283,809

METHOD OF COAGULATING CELLULOSIC SOLUTIONS

Emmette F. Izard, Kenmore, N. Y., assignor to E. I. du Pont de Nemours & Company, Wilmington, Del., a corporation of Delaware No Drawing. Application February 24, 1940, Serial No. 320,701

2 Claims. (Cl. 18—57)

This invention relates to the commercial scale production of shaped articles, especially continuous strips, from cellulose ethers which are soluble in aqueous caustic alkali solutions. More particularly it appertains to the continuous coagulation of cold aqueous caustic alkali soluble low substituted methyl cellulose, in the form of continuous films and the like, from dilute aqueous sodium hydroxide solutions thereof.

At the present time the viscose and cuprammonium cellulose industries supply most of the films, filaments, tubes, etc., that are manufactured from cellulosic substances which are precipitable from aqueous alkali solutions or dispersions. In both of these industries the cellulose substance is converted to a cellulose substitution derivative, this derivative dissolved in alkali solution, and regenerated therefrom in the desired shape (U. S. A. Patent No. 1,548,864). The obvious drawbacks to such a process include loss of the material forming the substituent radical, and expense of purification of the regenerated product.

Attempts to dissolve cellulose directly in dilute (2%–10%) aqueous caustic alkali and coagulate it therefrom (U. S. A. Patent 1,658,606) have been unsuccessful inter alia because the degradation necessary to make the cellulose dissolve prevents the regenerated product having durability and other properties comparable with the products of the viscose and cuprammonium procedures.

Great interest has recently been shown in the formation of shaped articles of cellulose substitution derivatives, such as methyl cellulose, which are soluble in aqueous solutions of caustic alkali and retain the substituent after precipitation. These products dissolve directly in dilute aqueous caustic alkali solutions and can be recovered therefrom as shaped products having excellent physical properties.

Unfortunately no means of coagulating such materials at a cost satisfactory for commercial scale operation having economic advantages over competing processes has heretofore been available. Coagulating baths having the same composition as the conventional regenerating baths of the viscose industry, for example, have been too expensive and have no economic advantage because of the cost of the replenishing components.

A way of coagulating shaped products of aqueous caustic alkali soluble cellulose ethers at a cost enabling them to be placed in commerce to compete with regenerated cellulose, has now been discovered. In general it comprises treating the shaped cellulose ether solution with an aqueous coagulating solution of caustic alkali substantially saturated with a soluble inorganic salt. Solutions of caustic alkali equivalent to 2% to 20% sodium hydroxide are used. A very satisfactory specific composition consists of a 5% solution of sodium hydroxide containing sufficient sodium sulfate to saturate it at 65° C.

In the following description and specific examples are disclosed the general principles and certain embodiments of the invention, as well as details of what is believed to be the best mode for carrying out the invention. The parts are given by weight throughout the application, unless otherwise specified.

Example I

A 9% sodium hydroxide solution containing 7% methyl cellulose (methoxyl content 3.89%) was spread on a glass casting plate, dried for 5 to 6 minutes at 120° C., and treated with an aqueous 10% sodium hydroxide bath containing 14% sodium sulfate. The casting plate remained in this coagulating bath for 1 minute. The films obtained from the casting solution were subsequently treated in an aqueous sodium sulfate bath. The gel film was of good strength and gauged 0.0033 inch in thickness. It dried to a film of 0.0011 inch in thickness.

Example II

A 9% sodium hydroxide solution containing 7% methyl cellulose (methoxyl content 3.89%) was spread on a glass casting plate and passed (without drying) at 60° C. through an aqueous bath containing 11% sodium hydroxide and 13% sodium sulfate. The cast film was allowed to remain in contact with this bath for 1 minute, after which it was washed with aqueous 10% sodium hydroxide solution. It was then washed with water, dilute sulfuric acid, and again with water, after which it was glycerinated and dried. The resulting films were weaker than those produced in Example I, but were strong enough to handle and strengthened up very materially after the final acid wash which removed the last traces of caustic from the film. The gel thickness of the film was 0.0083 inch and the dry thickness was 0.0011 inch.

Example III

A 9% sodium hydroxide solution containing 7% methyl cellulose (methoxy content 3.89%) was spread on a glass casting plate and passed directly into an aqueous bath containing the 5% sodium hydroxide and 22% sodium sulfate at 60° C. This amount of sodium sulfate saturated the bath at this temperature. The film was allowed to coagulate for 30 seconds in this bath, and then passed into a second aqueous bath containing 15% sodium sulfate. After passage through a third bath containing 2% sulfuric acid, it was washed with water, glycerinated and dried. The film produced was more desirable than that obtained in Example II because it was somewhat denser. The gel thickness of the film was 0.0075 inch and the dry thickness 0.001 inch.

Example IV

A 9% sodium hydroxide solution containing 7% methyl cellulose (methoxyl content 3.89%) was spread on a glass casting plate and passed directly into an aqueous bath containing 30% sodium solution at 60° C. Coagulation times of 30 to 60 seconds gave very good coagulation, and produced a gel film which gauged 0.0060 inch. The film after leaving the coagulating bath was given the same after treatments described in Example III. It dried down to a thickness of 0.0011 inch.

Example V

A 9% sodium hydroxide solution containing 8% methyl cellulose (methyoxyl content 3.89%) and having a viscosity of 618 seconds (at 20° C.) was extruded through a hopper into an aqueous 5% sodium hydroxide solution saturated with sodium sulfate. The bath was maintained at 65° C. during the extrusion. The extruded film was immediately picked up on a moving rubber belt and supported by the belt during subsequent coagulation. The film coagulated very well and could be carried through the bath on the belt and removed after a passage of about 10 feet. Upon being removed from the coagulating tank the film was strong enough to be handled in substantially the same manner as cellulose regenerated from viscose. Belt speeds of 100 to 140 feet per minute gave very satisfactory results.

Example VI

A 9% sodium hydroxide solution containing 9% methyl cellulose (methoxyl content 3.89%) was extruded directly into an aqueous bath containing 5% sodium hydroxide and 22% sodium sulfate at 60°–70° C. The dope coagulated satisfactorily.

Example VII

A 9% sodium hydroxide solution containing 9% methyl cellulose (methoxyl content 3.89%) was cast upon a nickel plate. The cast film and its support were immediately passed into an aqueous 5% sodium hydroxide solution containing 22% sodium sulfate at 70° C. After 15 seconds the film had coagulated sufficiently to be stripped from the plate.

When the same dope was coagulated in the same manner into a 2% sodium hydroxide bath at 80° C., 60 seconds was required for coagulation, and the resulting gel film was thicker and so much weaker than the film produced as above described that it could not be handled at an economical rate in a continuous operation.

Example VIII

A solution containing 7% methyl cellulose (methoxyl content 6.33%) was made up with 9% aqueous sodium hydroxide by freezing and slurry of the components. After thawing and removing the air, the solution was cast on a glass plate, partially dried by maintaining it at 120° C. for 6 minutes, and then placed in an aqueous bath containing 9% caustic and 16% sodium sulfate for a few minutes. It was then removed and further treated in a bath containing 10% sodium sulfate, after which treatment it was washed first with water and then with dilute sulfuric acid. A gel film of satisfactory density and strength was obtained. The dope before casting had a viscosity of 260 seconds at 25° C. in a standard viscose viscosity tube. This compares with a normal spinning viscosity of about 150 seconds for viscose solution containing 7% cellulose and 6% sodium hydroxide.

Example IX

A solution of 7% low substituted glycol cellulose in 7% aqueous sodium hydroxide was prepared by freezing and thawing a mixture of the components. The final solution was cast on a glass plate and coagulated in 5% sodium hydroxide saturated with sodium sulfate at 70° C. Within 30 seconds the film was sufficiently coagulated to enable it to be removed from the plate.

Example X

A 7% sodium hydroxide solution containing 7% methyl cellulose (methoxyl content 4.5%) was extruded through a hopper into an aqueous coagulating bath of 5% sodium hydroxide saturated with sodium sulfate (about 20%). The bath was maintained at 85° C. during the extrusion. The extruded film was picked up on a moving belt and processed in the manner described in Example V.

Example XI

A 9% sodium hydroxide solution containing 8% methyl cellulose (methoxyl content 3.89%) and having a viscosity of 618 seconds (at 20° C.) was extruded through a hopper into an aqueous 5% sodium hydroxide solution saturated with sodium sulfate (about 18%–19%). The coagulating bath was maintained at 100° C. during the extrusion. The extruded film was treated in the manner described in Example V.

The new process is workable with all cellulose ethers which are soluble in aqueous caustic alkali, but shaped products from the cellulose ethers which can only be dissolved by chilling to a temperature below 0° C. or even to about the freezing point of the solvent, have the greatest practical value and most desirable physical properties. In addition, the cold caustic soluble type just mentioned coagulates somewhat better in the coagulating baths of this invention.

Low substituted (less than one mol of substitution) methyl cellulose constitutes the preferred embodiment, but ethyl cellulose and other alkyl celluloses are advantageously handled by the present invention. The glycol type cellulose ethers, particularly glycol cellulose, and cellulose glycolic acid type cellulose ethers, can also be handled satisfactorily.

The preparation of the cellulose ethers is disclosed in U. S. A. Patents No. 1,589,606, 1,863,208, 2,060,056, 2,101,263, 2,123,883, 2,157,530, 2,160,107 and British Patent No. 459,123, and in the interest of brevity details thereof are omitted from this specification.

In general, four processing schemes have been found most suitable for the preparation of continuous strand articles. They are:

1. Spreading the cellulose substitution derivative solution or dope on a support (wheel, belt, plates or the like), partially drying the solution by the application of heat, treating the resultant with the coagulating bath, removing the article from the support and further processing it in the conventional manner similar to that used in the manufacture of transparent film from viscose. The conventional desulfuring treatment which accompanies the viscose process is not required by the products of this invention, and ordinarily the bleaching treatment can also be omitted. To remove the last traces of an alkali with a water wash seems to be very difficult, and it is therefore preferred that the films of this invention be passed through a souring bath after coagulation and water washing, to neutralize the last traces of the sodium hydroxide (or other alkali). The excess acid can be readily removed by carrying out the final washing step on the acid film from the souring bath;

2. Spreading the low substituted cellulose derivative solution on a support, directly coagulating the solution by treating with the coagulating bath, removing the article from the support and further processing as above;

3. Casting or extruding the solution directly from a hopper orifice or other extruding device into a coagulating bath, immediately picking up the formed article on a moving belt and supporting it during further coagulation, removing the coagulated article from the support and processing it further in the usual manner; and 4. Casting, extruding or spinning the cellulose ether solution directly into a coagulating bath, passing the extruded strand through the bath unsupported until coagulation is complete, and then subsequently processing in any desired manner.

The film casting apparatus may be conventional, for example, that disclosed in U. S. A. Patents No. 1,548,864 and 2,039,883. The coagulating bath may be maintained at constant concentration in any suitable manner. For satisfactory operation control the concentration of the salt component and the alkali component of the coagulating bath should not vary more than 0.3% and preferably not more than 0.2% during use.

The preferred coagulating bath temperature range is 65°–85° C., but excellent results have been obtained throughout the broader range of 45°–100° C.

Sodium hydroxide is the preferred caustic alkali because of its dissolving power, availability, low cost and other economic factors, but satisfactory operation is possible with the other alkali metal hydroxides, for example, potassium hydroxide and lithium hydroxide.

Sodium sulfate is the preferred saturating salt for the hot coagulating bath because it is obtained by-product-wise from a final sulfuric acid rinse given the shaped articles to insure complete elimination of caustic alkali, and because of a coagulating power somewhat superior to the other readily available sodium salts. Satisfactory operation can be obtained with sodium chloride, and a final hydrochloric acid rinse gives excellent results. Alkali metal salts in general can be used. Although ammonium salts are sometimes considered the equivalent of the alkali metal salts, they do not seem to behave similarly in the process of this invention.

Both the sodium hydroxide and the sodium sulfate can be economically recovered from the treating baths, and this is an important advantage for commercial scale operation.

Although satisfactory operating conditions are possible with a salt saturated coagulating bath containing 2% or 3% to 20% sodium hydroxide or its equivalent, it is preferred that the concentration of this caustic be 5% because of the effectiveness and economic features of such a bath. With this 5% solution, 19% to 22% sodium sulfate (depending upon the temperature) is sufficient for saturation in the neighborhood of 65° C. From the economic angle, the recovery of the salt and alkali is simple. Most of the sodium sulfate crystallizes from such a bath upon chilling to −5° C. as Glauber's salt, leaving a 7.6% sodium hydroxide solution. Upon concentration of that solution to 30%–50% sodium hydroxide followed by standing, all but a fraction of 1% of the sodium sulfate (remaining after concentrating) separates out.

Exact saturation of the coagulating bath with a salt is not necessary to satisfactory functioning of the bath, but such a concentration has given best results. The amount of salt should never vary from the saturation value more than a few percent.

The present invention offers the most promise, or advantages, in the manufacture of continuous film or webs thin enough to be used as sheet wrapping material. Such film can be cast at speeds comparable with the speed of cellulose film regenerated from viscose. It is also very satisfactory in the manufacture of caps. Other shaped or formed articles such as bands, tubes, pellicles, threads, fibers and the like may also be manufactured in a desirable manner thereby.

In addition to the advantages indicated above, the present coagulation scheme saves the acid heretofore regarded as necessary for the coagulation of cellulose ethers in large scale production.

The overall cost of methyl cellulose film prepared according to this invention is so low that it may possibly compete with partially transparent sheet wrapping materials made from paper (glassine).

As many apparently widely different embodiments of this invention may be made without departing from the spirit and scope thereof, it is to be understood that this invention is not limited to the specific embodiments thereof except as defined in the appended claims.

I claim:

1. The process which comprises extruding a sheet of methyl cellulose-sodium hydroxide solution into a sodium hydroxide-sodium sulfate coagulating bath, allowing the methyl cellulose to coagulate, and removing it from the said bath, said methyl cellulose-sodium hydroxide solution comprising essentially 8% methyl cellulose, 9% sodium hydroxide, and water, said methyl cellulose being of the cold caustic soda soluble type which can only be dissolved by chilling to a temperature below 0° C., said coagulating bath being maintained at about 65° C. during coagulation, and comprising essentially an aqueous 5% solution of sodium hydroxide saturated with sodium sulfate.

2. The process which comprises extruding a sheet of methyl cellulose-sodium hydroxide solution into a sodium hydroxide-sodium sulfate coagulating bath, allowing the methyl cellulose to coagulate, and removing it from the said bath, said methyl cellulose-sodium hydroxide solution comprising essentially 8% methyl cellulose, 9% sodium hydroxide, and water, said methyl cellulose being of the cold caustic soda soluble type, said coagulating bath being maintained at about 65°–85° C. during coagulation, and comprising essentially an aqueous 5% solution of sodium hydroxide saturated with sodium sulfate.

EMMETTE F. IZARD.